INVENTOR.
FREDERICK A. SEEDHOUSE

Oct. 15, 1968

F. A. SEEDHOUSE 3,405,991

MOUNTING MECHANISM FOR ZOOM TYPE OF OPTICAL
SYSTEMS FOR STEREOMICROSCOPE

Filed Nov. 12, 1965

FREDERICK A. SEEDHOUSE
INVENTOR.

BY Frank C. Parker

ATTORNEY

Oct. 15, 1968  F. A. SEEDHOUSE  3,405,991
MOUNTING MECHANISM FOR ZOOM TYPE OF OPTICAL
SYSTEMS FOR STEREOMICROSCOPE
Filed Nov. 12, 1965                                        4 Sheets-Sheet 4
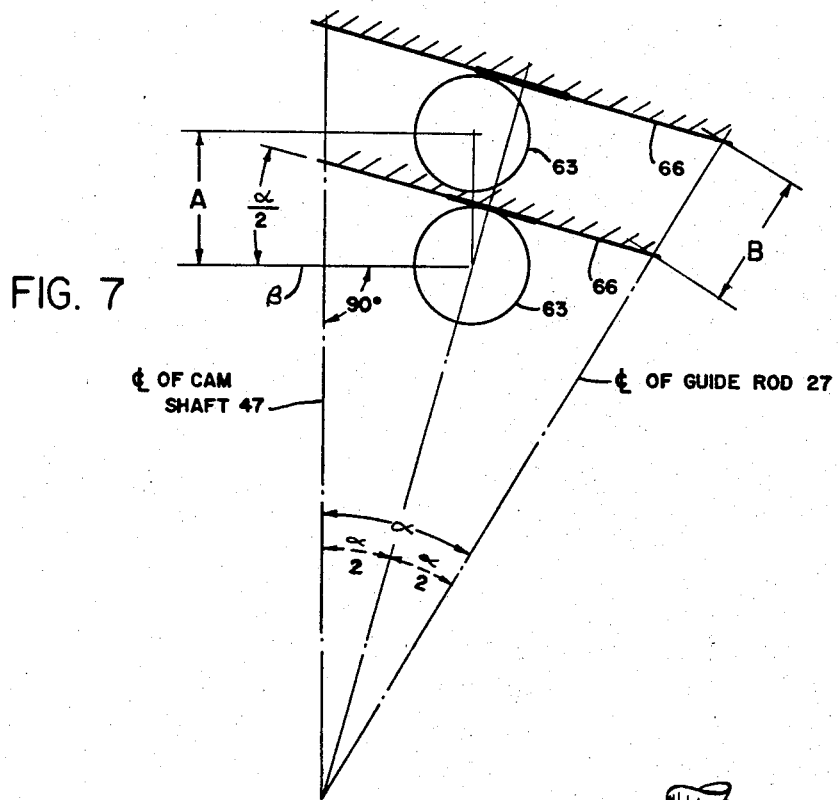
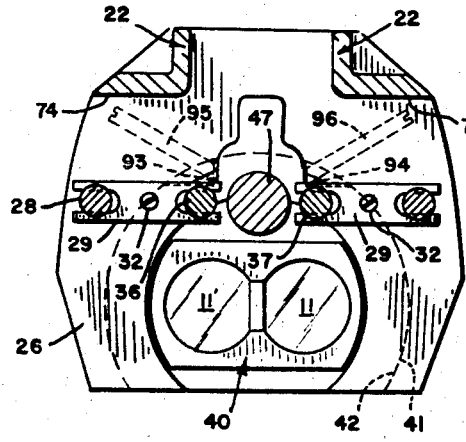
FIG. 9
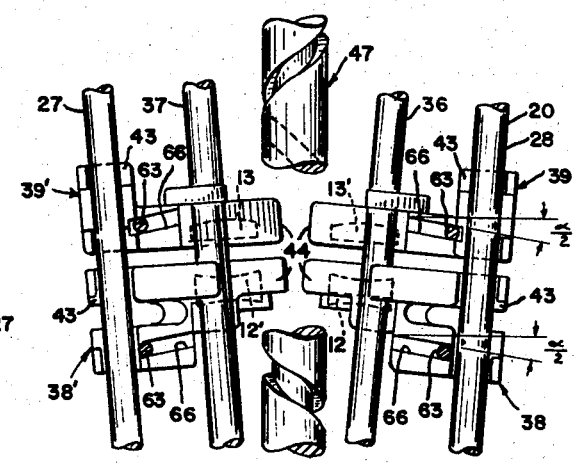
FIG. 8
FREDERICK A. SEEDHOUSE
INVENTOR.
BY *Frank C. Parker*
ATTORNEY United States Patent Office 3,405,991
Patented Oct. 15, 1968

3,405,991
MOUNTING MECHANISM FOR ZOOM TYPE OF
OPTICAL SYSTEMS FOR STEREOMICROSCOPE
Frederick A. Seedhouse, Henrietta, N.Y., assignor to
Bausch & Lomb Incorporated, Rochester, N.Y., a
corporation of New York
Filed Nov. 12, 1965, Ser. No. 507,396
9 Claims. (Cl. 350—36)

ABSTRACT OF THE DISCLOSURE

A mounting mechanism for zoom type of optical systems for a stereomicroscope is provided in which a single rotatable cam shaft is used for directing the respective excursions of movable intermediate and upper lens carriers along the pair of optical axes which converge at a point located in the specimen plane. The movable lens carriers travel along two pairs of spaced, essential coplanar, parallel guide rods. Like carriers are combined by means of a yoke which engages the cam shaft and which carries a cam follower mechnism for the pair of respective lens carriers. The means for mounting the stationary lower lenses is provided in the base of the housing which mounts and contains the above-mentioned components.

---

The present invention relates to mounting mechanism for the stereo optical systems of a stereomicroscope and particularly it relates to improvements in said mechanism for mounting zoom type of optical systems.

In mounting mechanism for the optical systems of stereomicroscopes, one of the difficult problems is to so design the mechanism that the stereo optical axes meet at a point on the object or specimen surface. This problem is rendered more difficult of solution in the case of zoom optical systems since the mechanism must be designed to effect the same magnification of the images produced by both of the stereo optical systems at all of the changes of magnification thereof. Said images must also coincide perfectly at all positions in the excursion of the movable lenses.

It is an object of the present invention to provide a novel mechanical mounting for a pair of stereo zoom optical systems of a stereomicroscope, said mechanisms being well coordinated to reliably effect duplicate magnification changes in the stereo images formed by said system during the entire excursion of its movable lenses.

Another object is to provide such a device wherein the individual lens holding members may be adjusted and aligned relative to each other so that the stereo axes of the optical systems meet at a single point in a specimen surface for all changes of magnification.

It is a further object to provide such a device which is sturdy in construction for reliable trouble-free service, the parts thereof being simple and easy to adjust and service.

Further objects and advantages will be found in the combination and arrangement and in the detailed construction of the parts of the mechanical mounting for the zoom optical systems, reference being had to the following specification and accompanying drawings, wherein:

FIG. 7 is a diagrammatic illustration of one novel feature of said mechanism;

FIG. 8 is a sectional view taken on line 8—8 of FIG. 2;

FIG. 9 is a sectional view taken on line 9—9 of FIG. 1 showing certain details of said mechanism;

FIG. 10 is a perspective view of a part of said mounting mechanism;

FIG. 11 is a rear perspective view of a lens holder member in said mounting mechanism; and FIG. 12 is a perspective view of another operating member thereof.

Figure 1:
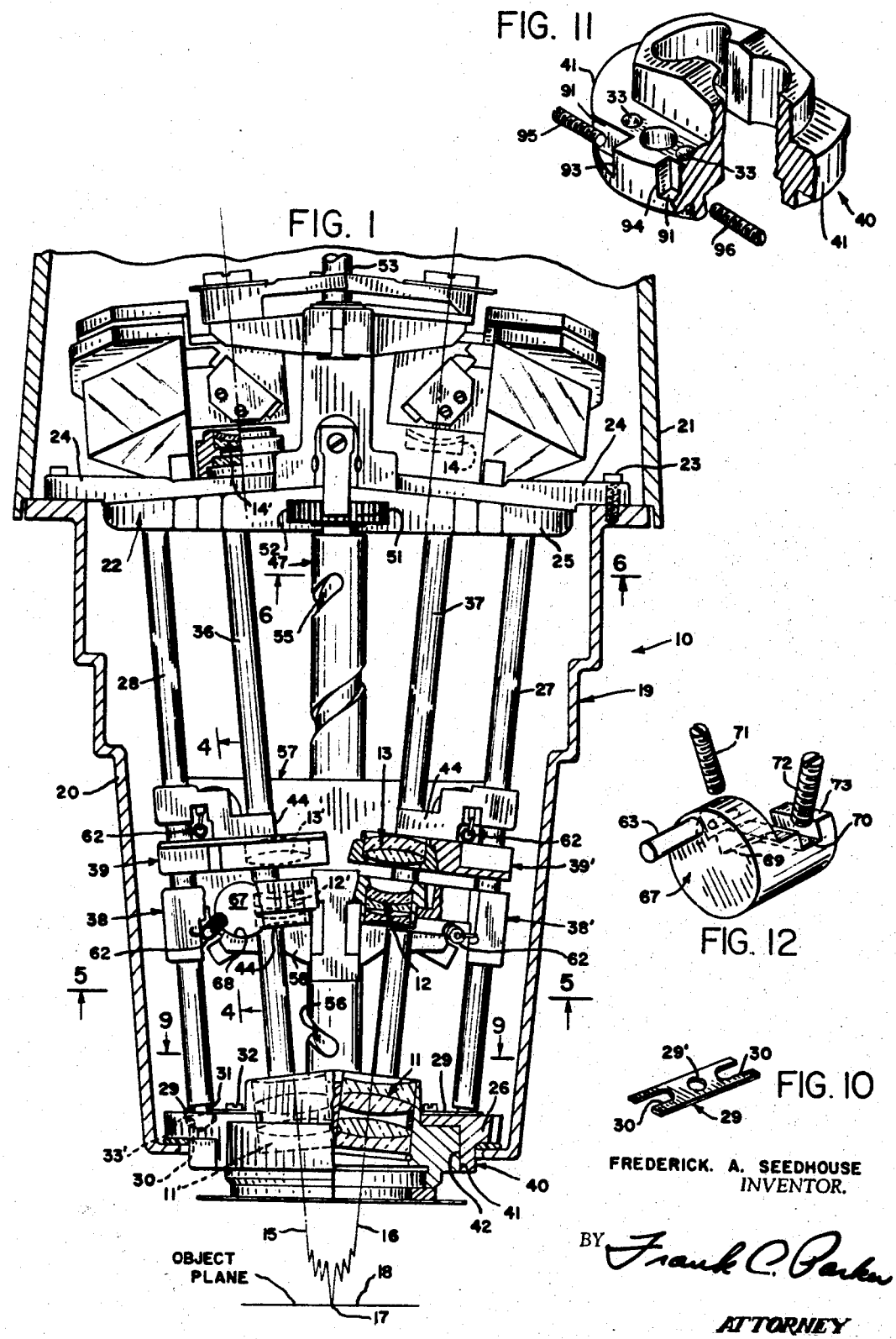
FIG. 1 is a front elevation of the aforesaid mechanical mounting for a pair of stereo zoom optical systems.

The lens mounting mechanism described herebelow is designed to accommodate a stereo optical system which is described in a patent application entitled "Optical System for Stereomicroscope," Ser. No. 368,236, filed May 18, 1964 in the names of Paul E. Nothnagle and Harold E. Rosenberger. As above mentioned, a lens mounting mechanism generally indicated by numeral 10 in FIG. 1 is provided for two stereo zoom type optical systems, each of which comprises a stationary lens 11 or 11', an intermediate and movable zoom system lens 12 or 12', an upper movable zoom system lens 13 or 13', a relay lens 14 or 14', and an eyepiece, not shown. Only one of each of the lens members 11, 12 and 13 is illustrated in full lines in FIG. 1, and the component lenses for the two zoom systems are optically aligned on two stereo optical axes 15 and 16 which converge to a point 17 in an object plane 18.

Figure 2:
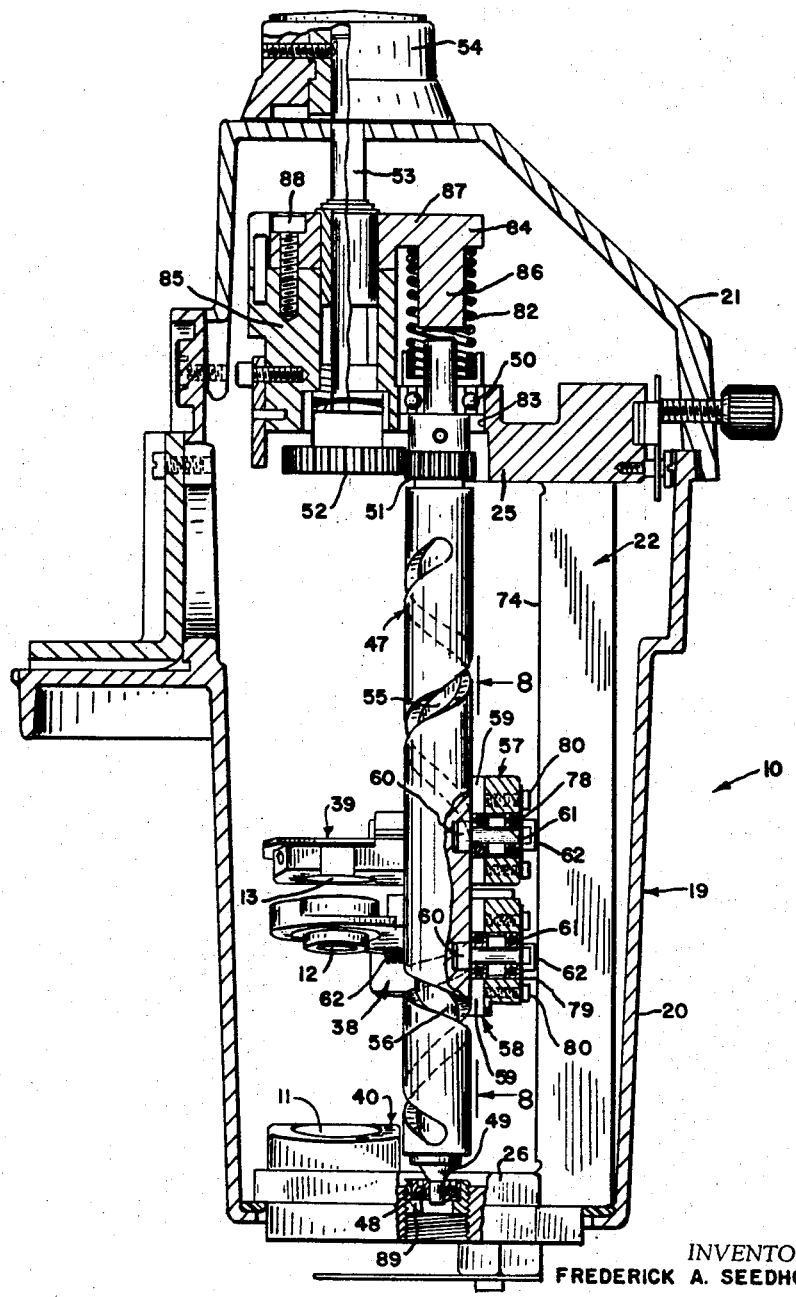
FIG. 2 is a side view partly in section and broken away of the mechanism shown in FIG. 1.

The two stereo zoom optical systems are mounted in and are enclosed by a housing 19 having a lower portion 20 and an upper portion 21 which is detachably secured thereto by means, not shown. In the lower portion 20 is secured an upright frame 22, as best shown in FIG. 2, preferably by means of a plurality of screws 23 extending through a plurality of projecting integral lugs 24, said frame having an upper bracket 25 and a lower bracket 26 formed on the opposite ends respectively and projecting forwardly thereof in a generally horizontal direction.

A pair of outer guide rods 27, 28 which serve an alignment function are secured in coplanar relation in the upper and lower brackets 25 and 26, the lower ends thereof being secured as shown in FIG. 1 by a flat retaining spring 29. The spring 29 is a flat leaf spring as shown in FIG. 10 and is provided at its outer ends with a U-shaped recess 30 which is adapted to engage in a peripheral or annular groove 31 formed near the lower end of the outer rods slightly above the lower bracket 26. The spring 29 is further provided in its midsection with a clearance hole 29' through which a clamp screw 32 projects to engage in a threaded hole in the lower bracket 26 so as to apply downward pressure to the spring 29 and bias the guide rods 27, 28 downwardly toward the lower bracket 26. Each outer guide rod 27, 28 is seated in a conically pointed recess 33' which is formed in the upper surface of the lower bracket 26. Cell 40 is held for slight rotation in the lower bracket 26 and the spring 29 serves to firmly hold the guide rods 27, 28 in these recesses 33' with ample freedom so that some pivotal or universal motion is possible in said recesses.

Figure 6:
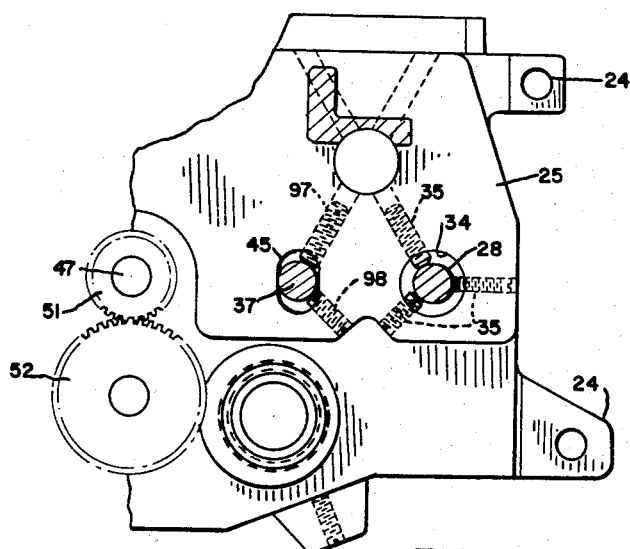
FIG. 6 is a sectional view taken on line 6—6 of FIG. 1.

For necessary adjustment purposes to be mentioned hereinafter, the upper ends of the guide rods project through large clearance openings 34 formed in the upper bracket 25 and the rods 27, 28 are laterally positioned with respect to the oversized openings by means of three substantially equally spaced adjustment screws, one of which is indicated at 35 shown in FIG. 6 which bear radially against the guide rods 27, 28. Thereby radial adjustments of the upper end of said guide rods are possible in all directions. The adjustment procedure is described hereinafter.

The inner guide rods 36, 37 are provided and are positioned in a plane which is parallel to the outer guide rods 27, 28 and are so positioned relative thereto that effectively two pairs of parallel rods are provided, the outer rods 27, 28 being carefully aligned parallel respectively to one of the stereo axes 15 and 16 so that motion along the rods is always parallel to one of the stereo axes.

On each pair of said parallel rods, a movable intermediate lens carrier 38 or 38' is slidably mounted wherein is fixed one of the aforesaid intermediate zoom lenses 12, 12' in optical alignment with one of the staionary lenses 11, 11', the left carrier 38 in FIG. 1 being mounted on rods 28 and 36 and the right carrier 38' being mounted on rods 27 and 37. Immediately above the movable lens carriers 38, 38' is slidably mounted a pair of movable zoom lens carriers 39, 39' wherein the pair of upper lenses 13, 13' is secured in optical alignment with the pair of movable zoom lenses 12, 12' and the pair of stationary zoom lenses 11, 11'.

The stationary zoom lenses 11 and 11' are mounted very close to each other in a unitary double lens cell 40 which is rotatably mounted in the lower bracket 26 as aforesaid by means of a cylindrical surface 41 formed therein as shown in FIG. 11. The cylindrical surface 41 is fitted to rotate slightly in a corresponding cylindrical bore 42 which forms a recess in bracket 26 to receive the cell, the relative angular motion between the double lens cell 40 and the lower bracket 26 being provided for a purpose to be described hereinafter.

The sole purpose of the outer guide rods 27, 28 is to direct the rectilinear motion of the upper and intermediate lens carriers 39, 38, 39', 38' parallel to their respective stereo axes 15 and 16, and the function of the inner and parallel guide rods 36, 37 is to prevent any angular motion of the aforesaid carriers while traveling along the parallel set of guide rods 27, 28. To accomplish this purpose, every lens carrier 38, 38', 39, 39' is provided with a deep V-shaped track or seating surface 43 which is elongated along the rod a sufficient distance to guarantee that there will be no lateral misalignment of the carriers 38, 38', 39, 39' during their excursion along the guide rods 27, 28. The lens carriers 38, 38' and 39, 39' are all mounted on the front side of the parallel rods 27, 28 and spring means 62 are provided as pointed out hereinafter for retaining the carriers on said rods.

As aforementioned, true rectilinear motion of said lens carriers parallel to their guide rods 27, 28 is assured by forming a flat contact pad 44 on each said lens carrier in longitudinal alignment with the inner guide rods 36, 37 and by applying the biasing action of the springs 62 to hold the lens carriers against the inner alignment rods 36, 37. It should be pointed out here that all of the parallel rods 27, 28, 36, 37 are substantially coplanar although the inner rods 36, 37 may, if necessary, occupy a position in a different plane which is spaced parallel to the plane of the outer rods 27, 28.

The lower end of the inner guide rods 36, 37 is secured in recesses 33 formed in the double lens cell 40 in the same manner as that which characterizes the outer guide rods 27, 28 and therefore any slight angular adjustment of the double lens cell 40 during the alignment process must be compensated at the upper end of said rods 36, 37 to preserve parallelism with said outer guide rods. For this purpose it is only necessary to move the upper end of the inner guide rods 36, 37 in a plane which is normal to the plane of the inner guide rods and for this purpose two elongated holes 45 are formed in the upper bracket 25 through which the inner rods 36, 37 project, the clearance between the narrow dimensions of the openings 45, 46 and the rods 36, 37 being only sufficient to allow sliding motion therebetween.

For the purpose of moving the intermediate and upper lens carriers 38, 38', 39, 39' along the guide rods 27, 28, a central cam shaft 47 is provided symmetrically of and substantially coplanar thereto between the inner guide rods 36, 37. Said cam shaft 47 is rotatably journaled at the lower end by means of a ball thrust bearing 48 in which a tapered pilot 49 formed at the lower end of the cam shaft 47 engages. At the upper end of the cam shaft 47 a second ball bearing 50 is provided for journaling the upper end of the cam shaft 47 in the upper bracket 25. On the upper end of the shaft 47 is provided a driven gear 51 which is engaged by a companion drive gear 52 formed on the lower end of a vertical operating shaft 53 to which an operating knob 54 is affixed. Axial motion of the intermediate and upper lens carriers 38, 38', 39, 39' relative to the cam shaft 47 is secured upon rotation thereof by means of a pair of differentially formed helical cam slots 55, 56 which are formed in upper and lower portions of the cam shaft in the vicinity of the respective lens carriers which they move.

A drive connection is provided between each lens carrier 38, 38', 39, 39' indirectly to the cam shaft 47 through the agency of an upper and a lower yoke which are numbered 57 and 58 respectively and extend transversely at right angles across the rear surface of the cam shaft 47. Each yoke 57, 58 reaches outwardly into the proximity of the outer guide rods 27, 28, and centrally of each yoke is formed an axially elongated V-shaped bearing or seating surface 59 which slides along the rear side of the actuating or cam shaft 47 and reliably positions the yokes 57, 58 at right angles to the cam shaft. Centrally of each yoke 57, 58 is secured a cam follower pin 60 which is radially positioned therein so as to project into one of the aforesaid cam slots 55 or 56. For the purposes of easy operation, each cam follower pin 60 is mounted by means of two ball bearings 61 in the yoke whereby the pin 60 rolls in said cam slots as best shown in FIG. 2.

In order to retain the yokes 57, 58 and the lens carriers 38, 38', 39, 39' with the open-sided bearing surfaces 43 in firm contact with the front side of the respective guide rods 27, 28, a plurality of tension springs 62 is provided. Said springs are secured at one end to a lens carrier and extend rearwardly, the rear ends thereof being fastened to the aforesaid yokes under tension. Therefore, said lens carriers as well as said yokes rest by spring pressure on their respective guide rods 27, 28 and cam shaft 47 but the normal operation requires that all of the seating surfaces 43 and 59 on each pair of rods and on the cam shaft respectively be firmly and evenly pressed against the respective surfaces on which they operate. By this construction it will be seen that assembly and disassembly of the lens carriers and yokes is a simple operation inasmuch as it is only necessary to hook up or unhook the tension springs 62.

In order to provide an operative tractive connection between the yokes 57, 58 and the lens carriers 38, 38', 39, 39' which they move, a drive pin 63 is seated in the outboard or end portions 64, 65 on each yoke and said drive pin projects forwardly thereof into a companion elongated slot 66 formed in the rear side of each lens carrier 38, 38', 39, 39'.

One of the very useful and novel features of this invention concerns the means by which the precise focusing movement of the individual upper and intermediate zoom lenses 13 and 12 respectively may be obtained. Such means comprises a circular body 67 which acts as an adjustment member and is fitted rotatably into a cylindrical recess 68 formed near the outer ends of said yokes. As shown in FIG. 12, said drive pins 63 are formed in any preferred manner near the peripheral portion of each of the disk-like bodies 67 on the side nearest to the outer guide rods 27, 28. Means are provided for rotating the circular body 67 within the yokes 57, 58 so as to raise or lower the position of the aforesaid drive pin 63. Such means in this form of the invention comprises a pair of abutment surfaces 69, 70 which are formed in angularly intersecting relation to each other in the rim of the circular bodies 67.

Figure 3:
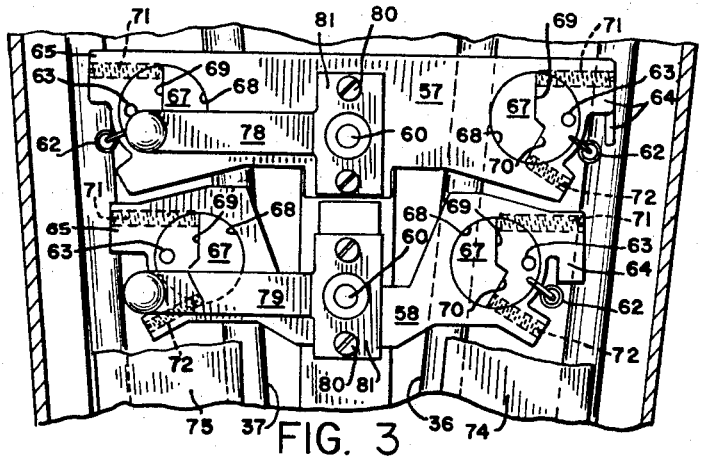
FIG. 3 is a rear elevation of a portion of the mechanism shown in FIG. 1, parts being broken away and shown in section.
Figure 4:
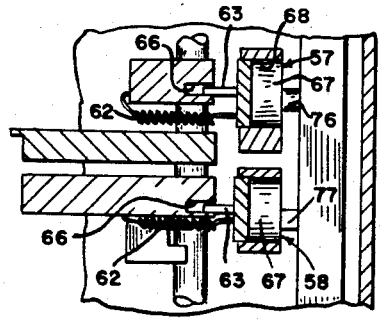
FIG. 4 is a longitudinal section taken on line 4—4 of FIG. 1 showing parts of said mechanism.

In the outer end of each yoke 57 or 58 is seated a pair of spaced adjustment screws 71, 72 which are threaded through the ends of the yokes and are so positioned relative to the circular adjustment member 67 that the ends of the screws 71, 72 bear against the aforesaid abutment surfaces 69, 70 as shown in FIGS. 3 and 12. By loosening one of the adjustment screws 71, 72 and tightening of the other, a slight angular motion of the adjustment member 67 is effected so as to change the vertical position of the drive pin 63 and consequently change the axial position of the zoom lens to which it is connected. As shown in FIG. 12, a radial flange 73 is formed on one end of the adjustment member 67 along one side of the abutment surface 70, said flange cooperating with the adjustment screw 72 to prevent longitudinal displacement of the adjustment member in the direction of the drive pin after assembly.

With particular reference to FIGS. 7 and 8, a further novel feature is provided whereby the motion A of the yokes 57 or 58 along the cam shaft 47 is equalized with the motion B of the lens carriers 38, 39, 38', 39' along their guide rods 27, 28. For this purpose, the aforesaid slots 66 wherein the drive pins 63 engage are inclined obliquely downwardly at their outer ends with respect to a normal $\beta$ to the cam shaft 47 as shown in FIG. 7 so as to form an included angle between the slot and cam shaft which is equal to 90° minus half of the angle $\alpha$ between the cam shaft and guide rods. By reference to FIGS. 7 and 8, it will be seen that by positioning the slot 66 in the lens carriers 38, 38', 39, 39' at such an angle $\alpha/2$, the geometry is such that the drive pin 63 moves along the slot 66 slightly as the associated yoke is moved along the cam shaft 47, and therefore the motion of the yoke along the cam shaft is equalized with the motion of the lens carriers along the guide rods. The described geometry is very advantageous to provide interchangeability of the cam shaft between stereo instruments and monocular instruments since the lens carriers will operate in the same manner for either instrument.

Figure 5:
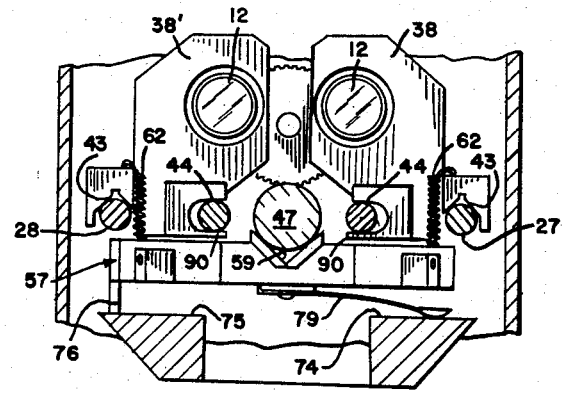
FIG. 5 is a sectional view taken on the line 5—5 of FIG. 1.

In order to prevent any angular rotation about the cam shaft of the yokes 57, 58 during the travel along the cam shaft 47, two flat surfaced and laterally spaced outboard rails 74, 75 are formed on the front faces of the vertical portions of the frame 22, the flat surfaces thereof being substantially coplanar. On the rail 75 is firmly pressed a pair of contact bosses 76, 77 which are formed on the outboard ends of the yokes 57, 58 respetcively as shown in FIGS. 3 and 5. For this purpose, the contact bosses 76, 77 on the yokes are biased against their respective rails 74, 75 by means of the pair of cantilever leaf springs 78, 79 which project laterally of the cam shaft 47 along the yokes and are fixed at the inner ends thereof by suitable means such as the screws 80 to the central part of their respective yokes as shown in FIGS. 2 and 3. The fixed ends of the cantilever springs 78, 79 serve a second function as shown in FIGS. 2 and 3 since it is provided with a broad base portion 81 which acts as a cover or retainer plate for the ball bearings 61.

For the dual purpose of firmly seating the cam shaft 47 on its thrust bearing 48 as well as to prevent any gross upward axial displacement of said shaft which might allow the end 49 of the shaft to become disengaged, a compression type of coil spring 82 is seated at its lower end effectively against the upper bearing member 50. Said bearing member 50 is slidably mounted in a bore 83 formed in the upper bracket 25 whereby the bearing moves axially with the shaft 47. The upper end of the spring 82 is seated under compression against a rearwardly projecting abutment lug 84 located above the shaft 47 and formed on a centrally located boss 85 which is a part of the upper bracket 25. Furthermore, on the abutment lug 84 is formed a depending stop member 86 which projects through the open central space in the spring 82 into close proximity with the upper end of the shaft 47 as shown in FIG. 2. The boss 85 may comprise a removable cap 87 whereon the lug 84 is directly formed and a suitable screw 88 is provided for securing the cap onto the body of the boss 85.

The above-described construction provides an advantageous mechanism for adjusting the lenses 12, 12' and 13, 13' axially as required during assembly or during servicing operations. For this purpose an adjusting ring 89 as shown in FIG. 2 is threaded into a tapped opening in the lower bracket 26, the bearing 48 being seated therein. Rotation of the adjusting ring 89 raises and lowers lenses 12 and 13 against the resistance of the spring 82.

As a further safeguard against damage caused by rough handling, hook-like portions 90 are formed on each lens carrier 38, 38', 39, 39' as shown in FIG. 5 projecting across the respective inner guide rods 36, 37 on the opposite side of the rods from the flat surfaces 44. By the use of such a mechanism, sudden blows or jarring movements will not stretch the tension springs 62 and allow the lens carriers to rise off from their guide rods 36, 37.

With regard to the aforementioned angular adjustability of the double lens cell 40, mechanism is provided to that end comprising a pair of notches or indentations 91, 92 formed in the periphery of the lens cell. Said notches 91, 92 terminate respectively in vertical walls 93 and 94 against which a pair of opposed adjusting screws 95, 96 engage. The adjusting screws 95, 96 are threaded in the lower bracket member 26 and are angularly directed toward the vertical walls 93 and 94 as shown best in FIG. 9.

In the case where vertical phoria is found in the stereo optical systems due to an unfavorable accumulation of manufacturing tolerances in the apparatus, said phoria may usually be removed by very slightly rotating the double lens cell 40. After such a rotation, the lower ends of the inner rods 36, 37 are of course misplaced slightly so that the inner rods are no longer strictly parallel to or lie in a single plane with the outer rods 27, 28. In order to restore the plane of the inner rods 36, 37 truly parallel to the plane of the outer rods 27, 28, the upper ends of the guide rods 36 and 37 are moved by the adjusting screws 97, 98 along the elongated openings 45 sufficiently to effect parallelism of said planes as shown in FIG. 6.

From the foregoing, it will be seen that a mounting mechanism for a zoom type of stereo optical system is here provided which is so constructed that a true stereo view of an object may be seen at all magnifications within the zoom range of the instrument, the parts thereof being constructed for durable and reliable precision service even when subjected to the rugged handling which is usual with a portable instrument.

Although only certain forms and arrangements of parts of the invention have been shown and described in detail, other forms are possible and changes and substitutions may be made therein without departing from the spirit of the invention as defined in the appended claims.

I claim:
1. A mechanical mounting for the two zoom type optical systems of a stereomicroscope wherein the stereo optical axes of said systems meet at a point in the object plane, said mounting having in combination
  an upright frame,
  an upper and a lower bracket formed parallel to each other on the opposite ends and projecting from the front of the frame,
  two pairs of parallel rods which are secured at their opposite ends in said upper and lower brackets, the pairs of rods being substantially coplanar and converging toward each other from top to bottom, each pair of rods being parallel to one of said stereo optical axes, means for mounting a pair of zoom system lenses on said stereo optical axes in a dual lens cell carried in said lower bracket, each zoom optical system including an intermediate and an upper movable lens, an intermediate lens carrier and an upper lens carrier wherein said intermediate and upper movable lenses are secured, one of each said lens carriers being held on each pair of parallel rods, an elongated open-sided bearing portion formed on each said carrier parallel to the axis of the lens which it carries, said portion being fitted to slide on the front side of the outer one of said pairs of rods to control direction of movement of the carrier, a contact element formed on each said carrier crosswise to the innermost of said rods whereon said element slides to prevent angular motion of said lens carriers during the excursion thereof, a cam shaft rotatably held in said frame in an upright position symmetrically between said stereo axes, upper cam means and lower cam means of different cam properties formed in said cam shaft, an upper and a lower yoke extending across the back side of said cam shaft and said guide rods and connected to the pairs of upper and intermediate lens carriers respectively, an elongated V-shaped seat formed in the direction of said shaft on each yoke and fitted to slide on the back side of said cam shaft while maintaining said yoke normal to the shaft, cam follower means formed on each yoke and engaging individually with one of said cam means so that each follower means operates a pair of opposite zoom lens carriers to which the yoke is connected, and a resilient member extending under tension between and attached to the end of a yoke and the proximate lens carrier so as to forcibly hold the carriers in firm contact with the rods and simultaneously hold the yokes on the cam shaft.

2. A mechanical mounting for the two zoom optical systems of a stereomicroscope wherein the stereo optical axes of said systems meet at a point in the object plane, said mounting comprising an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and converging toward each other from top to bottom, each pair of rods being parallel to one of said stereo optical axes, means for mounting a pair of zoom system lenses on said stereo optical axes in corresponding lens cells carried in said lower bracket, each zoom optical system including an intermediate and an upper movable lens, an intermediate lens carrier and an upper lens carrier wherein said intermediate and upper movable lenses are secured, an extended V-shaped seat formed on each said carrier parallel to the optical axis of the lens held therein and fitted to slide on the front side of the outer one of said pair of rods to control direction of movement of the carrier, a flat contact surface formed in an axial direction on each said carrier tangent to and bearing against the front side of the inner one of said pair of rods whereon its slides to prevent angular motion of said lens carriers, a cam shaft rotatably held in said frame in an upright position symmetrically between said stereo axes, upper cam means and lower cam means of different cam properties formed in said cam shaft, an upper and a lower yoke extending across said cam shaft and said guide rods and connected to said cam means and to said carriers so as to move said upper and intermediate lens carriers respectively simultaneously, an extended V-shaped seat formed transversely on each yoke and fitted to slide on the back side of said cam shaft which maintains said yoke normal to the shaft, cam follower means formed on each yoke and engaging individually with one of said cam means so that each cam follower means operates a pair of zoom lens carriers, and a plurality of tension springs, each of which is anchored at one of its ends to one end of one of said yokes and is anchored at the other end under tension to the proximate one of said lens carriers so as to forcibly hold the lens carriers on their support rods and simultaneously hold the yokes against the cam shaft.

3. A mechanical mounting for the two zoom optical systems of a stereomicroscope wherein the stereo optical axes of said systems meet at a point in the object plane, said mounting having in combination an upright frame characterized by an upper and a lower bracket formed horizontally on the top and bottom ends and projecting from the front thereof, two pairs of parallel rods which are secured at their opposite ends in said upper and lower brackets, said pairs of rods being substantially coplanar and converging toward each other from top to bottom, each pair of rods being parallel to one of said stereo optical axes, a circular lens holding plate wherein two intersecting circular walls are formed so as to define two intersecting openings therethrough, a cylindrical wall defining an opening formed in said lower bracket wherein said plate is fitted to turn, a pair of lens cells for mounting a pair of lens which are alignable with the stereo axes and are secured in the two intersecting openings of said plate, means for minutely rotating said plate in the opening in the lower bracket for the purpose of aligning said lenses with said axes, a pair of intermediate lens carriers and a pair of upper lens carriers wherein the corresponding movable zoom lenses of said systems are mounted, one of each said carriers being mounted on each pair of parallel rods, an elongated V-shaped seat formed on each carrier parallel to the optical axis of the lens mounted therein, said seat being slidably fitted to move on the front side of one of the two outermost of said rods, a contact pad formed on each carrier crosswise to the two innermost rods and resting tangentially on the front side thereof to prevent rotation of the carriers during their excursion along the rods, a cam shaft rotatably held in said upper and lower brackets in median position with respect to and in the plane of said rods, upper cam means and lower cam means of different cam properties formed in said cam shaft, an upper and a lower yoke extending across the back side of said cam shaft and said guide rods and connected to said cam means and to said carriers so as to move said upper and intermediate lens carriers respectively, an elongated V-shaped seat formed on each of said yokes along said shaft and fitted to slide long the back side thereof, cam follower means formed on each yoke and engaging individually with one of said cam means so that each cam follower operates a pair of zoom lens carriers, and a plurality of coil springs which are connected at one end to one of said carriers and at the other end under tension to one end of one of said yokes and pass between said parallel rods whereby the carriers and the yokes are held in operative position by the tension springs.

4. A mechanical mounting for the two zoom optical systems of a stereomicroscope wherein the stereo optical axes of said systems meet at a point in the object plane, said mounting having in combination an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and converging toward each other from top to bottom, each pair of rods being parallel to one of said stereo optical axes, a lens holding member having two duplicate adjoining lens cells wherein a pair of zoom system lenses of said optical systems are secured, means for rotatably mounting the lens holding member in said lower bracket, means for adjusting the angular alignment of the lens holding member so that the optical centers thereof may be angularly oriented in said bracket, an intermediate lens carrier and an upper lens carrier wherein an intermediate and an upper movable zoom lens is mounted for each said optical system, an elongated V-shaped seat formed on each said lens carrier parallel to the optical axis of the lens mounted therein, said seat being fitted to slide on the front side of the outer one of said pairs of rods to control the direction of movement of the carrier, a contact pad formed on each said carrier crosswise to the innermost of said pairs of rods whereon said pad bears tangentially to prevent angular motion of said carriers during the excursion thereof, a cam shaft rotatably held in said upper and lower brackets in upright position symmetrically between said stereo axes and offset therefrom, said shaft having upper and lower differential cam slots of the same angular extent formed therein, an upper and a lower yoke extending across the back side of said cam shaft and said guide rods, an elongated V-shaped seat formed on each of said yokes along said shaft and fitted to slide on the back side thereof so as to maintain the yoke normal to the shaft as it slides thereon, means including a cam follower pin formed centrally on each yoke and projecting therefrom toward the cam shaft into engagement with one of said cam slots, a pair of connector pins anchored in the end portions of each of the yokes respectively, the unsecured ends of said pins being connected individually to the two proximate lens carriers to direct the movement thereof, a plurality of tension springs, each of which is anchored at one of its ends to one end of one of said yokes and is anchored at the other end under tension to the proximate one of said lens carriers and passes between said parallel rods so as to forcibly hold the carriers against their support rods and simultaneously hold the yokes against the cam shaft, and adjusting means cooperatively constructed on each end of each yoke and on each said connector pin for moving said connector pin in a direction substantially parallel to the axis of said shaft whereby the associated lens carrier is moved to adjust the focus of the zoom lens contained therein.

5. A mechanical mounting for the two zoom optical systems of a stereomicroscope wherein the stereo optical axes of said systems meet at a point in the object plane, said mounting having in combination an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and converging toward each other from top to bottom, each pair of rods being parallel to one of said stereo optical axes, means for mounting a pair of zoom system lenses on said stereo optical axes in corresponding lens cells carried in said lower bracket, an intermediate lens carrier and an upper lens carrier wherein an intermediate and an upper movable zoom lens is mounted for each said optical system, means constructed on said intermediate and upper lens carriers for slidably mounting and non-rotatably guiding said carriers in a straight path on the front side of said pairs of rods, a cam shaft rotatably held in said upper and lower brackets in an upright position symmetrically between said stereo axes, said position being coplanar with said rods, means forming two axially spaced differential cam slots of the same angular extent in said cam shaft, an upper and a lower yoke extending across the back side of said cam shaft and normal thereto and across the back side of said guide rods, each yoke being connected to a pair of lens carriers, an elongated V-shaped seat orthogonally and centrally formed on each of said yokes, the seats being fitted to slide on the back side of said shaft so as to maintain the yokes in a position normal to said shaft, a plurality of tension springs, each one being anchored at one end to one end of said yokes and being anchored at the other end to one of said lens carriers and positioned between said parallel rods to hold the carriers and yokes assembled on their respective rods and shaft, a cam follower pin held in a fixed central position on each yoke in alignment with said shaft so as to project into engagement with one of said cam slots thereon, and the connection between said yokes and said carriers comprising means cooperatively formed on said yokes and carriers for tractively moving said carriers simultaneously along their support rods the same vertical distance that the respective yokes are moved axially along said shaft.

6. A mechanical mounting for the two zoom optical systems of a stereomicroscope wherein the stereo optical of said systems meet at a point in the object plane, said mounting having in combination an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and convering toward each other from top to bottom, each pair of rods being parallel to one of said stereo optical axes, means for mounting a pair of zoom system lenses on said stereo optical axes in corresponding lens cells carried in said lower bracket, an intermediate lens carrier and an upper lens carrier wherein an intermediate and an upper movable zoom lens is mounted for each said optical system, means constructed on said intermediate and upper lens carriers for slidably mounting and non-rotatably guiding said carriers on the front side of said pairs of rods, a cam shaft rotatably held in said upper and lower brackets in an upright position symmetrically between said stereo axes, said shaft lying in a plane which is parallel to and spaced rearwardly from the plane of said rods, means forming two axially spaced differential cam slots of the same angular extent in said cam shaft, an upper and a lower yoke extending across the back side of said cam shaft and normal thereto and across the back side of said guide rods, each yoke being connected to a pair of lens carriers, an elongated V-shaped seat formed orthogonally on each of said yokes, the seats being fitted to slide on the back side of said shaft so as to maintain the yokes in a position normal to said shaft, a plurality of tension springs, each one being anchored at one end to one end of one of said yokes and being anchored at the other end to one of said lens carriers in a position between said parallel rods to hold the carriers and yokes assembled on their respective rods and shaft, a cam follower pin held in a fixed central position on each yoke in alignment with said shaft so as to project into engagement with one of said cam slots thereon, the connection between said yokes and said carriers comprising a connector pin secured in each end of each said yoke and extending toward the proximate lens carrier, and a pair of parallel spaced walls forming a slot wherein said connector pin engages, said slot being formed across the rear surface of each lens carrier, the slots in either pair of lens carriers being inclined downwardly from a normal to said shaft so as to form an included obtuse angle which is 180° minus half of the stereo angle between said stereo axis whereby the axial travel of either yoke along said shaft is equalized with the vertical travel of the lens carrier moved thereby along its respective rods.

7. A mechanical mounting for the two zoom optical systems of a stereomicroscope wherein the stero optical axes of said systems meet at a point in the object plane, said mounting having in combination an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and converging toward each other from top to bottom, each pair of rods being parallel to one of said stereo optical axes, means for mounting a pair of zoom system lenses on said stereo optical axes in corresponding lens cells carried in said lower bracket, an intermediate lens carrrier and an upper lens carrier wherein an intermediate and an upper movable zoom lens is mounted for each said optical system, means constructed on said intermediate and upper lens carriers for slidably mounting and non-rotatably guiding said carriers on the front side of said pairs of rods, a cam shaft rotatably held in the upper and lower brackets in an upright position symmetrically between said stereo axes, said shaft being substantially coplanar with said rods, means forming two axially spaced differential cam slots of the same angular extent in said cam shaft, an upper and a lower yoke extending across the back side of said cam shaft and normal thereto and across the back side of said guide rods, each yoke being tractively connected to a pair of lens carriers, an elongated V-shaped seat formed orthogonally on each of said yokes, the seats being fitted to slide on the back side of said shaft so as to maintain the yokes in a position normal to said shaft, a plurality of tension springs, each one being anchored at one end to one end of one of said yokes and being anchored at the other end to one of said lens carriers in a position between said parallel rods to hold the carriers and yokes assembled on their respective rods and shaft, a cylindrical wall defining a recess which is formed in the front side of each of said yokes in alignment with the center of said V-shaped seat, anti-friction bearing mechanism fitted to said cylindrical wall in said recess, a cam follower pin secured in each bearing mechanism rotatably with respect to said yoke and projecting therefrom into engagement with one of said cam slots, a pair of diverging longitudinal flat surfaces formed adjacent to the opposite edges on the front side of said frame parallel to the plane of said rods, an abutment lug formed on the rear side at one end of each of said yokes for contact with one of said longitudinal surfaces to prevent rotation of the yokes about said shaft, and a combination cover plate for said anti-friction bearing mechanism which is secured to each yoke over said recess and is provided with a laterally extended resilient arm formed from spring material which forcibly contacts and slides on the other of said longitudinal surfaces whereby each yoke is prevented from rotation about the shaft while being easily moved therealong.

8. A mechanical mounting for the two zoom optical systems of a stereomicroscope wherein the stereo optical axes of said systems meet at a point in the object plane, said mounting having in combination an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and converging toward each other from top to bottom, each pair of rods being parallel to one of said stereo optical axes, means for mounting a pair of zoom system lenses on said stereo optical axes in a dual lens cell carried in said lower bracket, each zoom optical system including an intermediate and an upper movable lens, an intermediate lens carrier and an upper lens carrier wherein said intermediate and upper movable lenses are secured, one of each said lens carriers being held on each pair of parallel rods, an elongated open-sided bearing portion formed on each said carrier parallel to the axis of the lens which it carries, said portion being fitted to slide on the front side of the outer one of said pairs of rods to control direction of movement of the carrier, a contact element formed on each said carrier crosswise to the innermost of said rods whereon said element slides to prevent angular motion of said lens carriers during the excursion thereof, a hook-like element formed on each said carrier crosswise to the innermost of said rods and contiguous to said rods on the side opposite to said contact element, a cam shaft rotatably held in said frame in an upright position symmetrically between said stereo axes, upper cam means and lower cam means of different cam properties formed in said cam shaft, an upper and a lower yoke extending across the back side of said cam shaft and said guide rods and connected to the pairs of upper and intermediate lens carriers respectively, an elongated V-shaped seat formed into the direction of said shaft on each yoke and fitted to slide on the back side of said cam shaft while maintaining said yoke normal to the shaft, cam follower means formed on each yoke and engaging individually with one of said cam means so that each follower means operates a pair of opposite zoom lens carriers to which the yoke is connected, and a resilient member extending under tension between and attached to the end of a yoke and the proximate lens carrier so as to forcibly hold the carriers in firm contact with the rods and simultaneously hold the yokes on the cam shaft.

9. A mechanical mounting for the two zoom type optical systems of a stereomicroscope wherein the stereo optical axes of said systems meet at a point in the object plane, said mounting having in combination an upright frame, an upper and a lower bracket formed parallel to each other on the opposite ends and projecting from the front of the frame, two pairs of parallel rods which are secured at their opposite ends in said upper and lower brackets, the pairs of rods being substantially coplanar and converging toward each other from top to bottom, each pair of rods being parallel to one of said stereo optical axes, means for mounting a pair of zoom system lenses on said stereo optical axes in a dual lens cell carried in said lower bracket, each zoom optical system including an intermediate and an upper movable lens, an intermediate lens carrier and an upper lens carrier wherein said intermediate and upper movable lenses are secured, one of each said lens carriers being held on each pair of parallel rods, an elongated open-sided bearing portion formed on each said carrier parallel to the axis of the lens which it carries, said portion being fitted to slide on the front side of the outer one of said pairs of rods to control direction of movement of the carrier, a contact element formed on each said carrier crosswise to the innermost of said rods whereon said element slides to prevent angular motion of said lens carriers during the excursion thereof, a cam shaft rotatably held in said frame in an upright position symmetrically between said stereo axes, upper cam means and lower cam means of different cam properties formed in said cam shaft, an upper and a lower yoke extending across the back side of said cam shaft and said guide rods and connected to the pairs of upper and intermediate lens carriers respectively, an elongated V-shaped seat formed in the direction of said shaft on each yoke and fitted to slide on the back side of said cam shaft while maintaining said yoke normal to the shaft, cam follower means formed on each yoke and engaging individually with one of said cam means so that each follower means may impart a motion to a pair of opposite zoom lens carriers to which the yoke is connected, a tension spring extending under tension between and attached to the end of a yoke and the proximate lens carrier and functioning to hold the carriers on the guide rods while also holding the yoke on said cam shaft, an antifriction thrust bearing wherein the lower end of said cam shaft is slidably fitted and a second antifriction bearing wherein the upper end of said cam shaft is secured, the outer diameter of said second bearing slidably held in said upper bracket, an annular adjustment ring wherein the lower antifriction bearing is secured, thread means cooperatively formed on said adjustment ring and in a bore in said lower bracket for axially adjusting the position of the cam shaft and the lens carriers connected thereto, an abutment lug carried in a fixed position by said upper bracket in spaced relation to and extending across the upper end of said cam shaft, and a compression spring seated on said abutment lug at one end and seated under spring stress at the other end against said second antifriction bearing whereby the cam shaft is biased against the lower antifriction bearing.

References Cited

UNITED STATES PATENTS

| | | | |
|---|---|---|---|
| 2,543,656 | 2/1951 | Bradford et al. | 352—59 X |
| 2,942,519 | 6/1960 | Boughton et al. | 350—44 X |
| 3,028,791 | 4/1962 | Clark et al. | 350—44 |
| 3,028,792 | 4/1962 | Krajowski et al. | 350—44 |
| 3,030,861 | 4/1962 | Mortimer et al. | 350—44 X |
| 3,158,076 | 11/1964 | Back et al. | 95—45 |
| 3,166,629 | 1/1965 | Walter | 350—44 |

DAVID SCHONBERG, *Primary Examiner.*

P. R. GILLIAM, *Assistant Examiner.*